April 25, 1939.　　D. M. WRIGHT　　2,155,748
RAKE CLASSIFIER
Filed Nov. 23, 1936
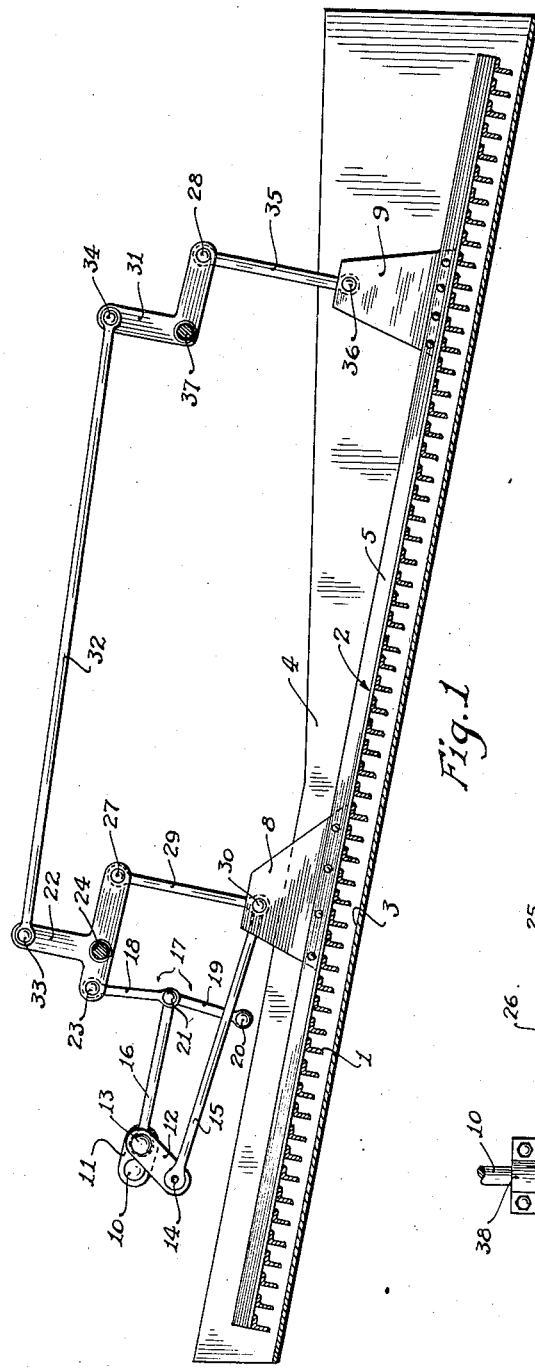
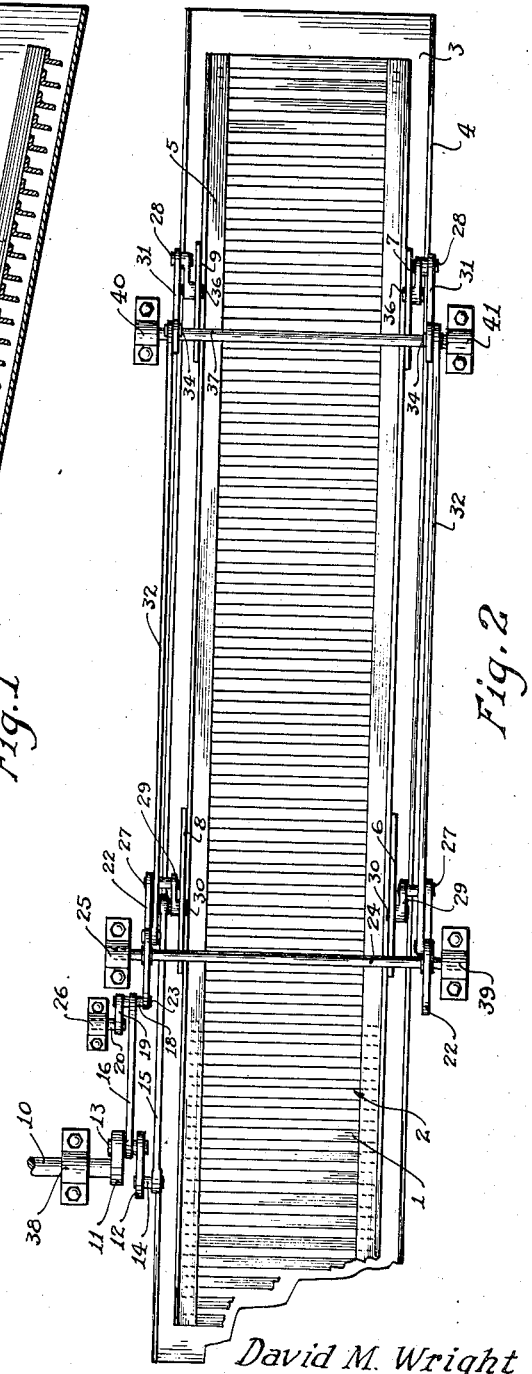
David M. Wright
INVENTOR
ATTEST-
Wm C. Meiser
BY
ATTORNEY Patented Apr. 25, 1939

2,155,748

UNITED STATES PATENT OFFICE 2,155,748

RAKE CLASSIFIER

David M. Wright, Agricola, Fla., assignor to Industrial Patents Corporation, Chicago, Ill., a corporation of Delaware Application November 23, 1936, Serial No. 112,408

2 Claims. (Cl. 209—462)

This invention relates to ore conveyors and classifiers.

One of the objects of the invention is to provide a classifying rake which gives a long, substantially flat operating zone.

Other objects of the invention will be apparent from the description and claims which follow.

A preferred embodiment of the invention is shown in the drawing.

Figure 1 is a side view, partly in section.

Figure 2 is a plan view of the device shown in Figure 1. The cross pieces 1 of rake 2 operate on inclined bed 3 of trough 4. Cross pieces 1 which may be made of channel iron or angle iron are rigidly affixed to frame 5 of rake 2. Plates 6, 7, 8, and 9 are rigidly affixed to frame 5. The mechanism for dragging the rake upwardly on the bed, lifting it and returning it to repeat the cycle, is operated by shaft 10 through the cranks 11 and 12 and the crank pins 13 and 14.

The lateral motion of the rake is governed by crank pin 14 through the rod 15. Crank pin 13 operates the rod 16 to the toggle 17, consisting of the rods 18 and 19 and the pins 20 and 21.

Rod 18 is connected to the lever arm 22 by the pin 23. The lever arm 22 is pivoted on the shaft 24, which is fixed in position as by keepers 25 and 39. Rod 19 is pivoted on pin 20 which is held in fixed position as by keeper 26.

The motion of the rod 16 by the crank pin 13 causes an alternate lengthening and shortening of the distance between pins 20 and 23, thus giving motion to the lever arm 22, and alternately raising and lowering the rake. The raising and lowering is accomplished by reason of the resultant rise and fall of pins 27 and 28. The rod 29 is pivoted to lever arm 22 by pin 27 and to plate 8 by pin 30. The motion of lever arm 22 is communicated to lever arm 31 by rod 32, pivoted to lever arm 22 by pin 33 and to lever arm 31 by pin 34. Rod 35 is pivoted to lever arm 31 by pin 28 and to plate 9 by pin 36. Lever arm 31 is pivoted on fixed shaft 37. Shaft 10, which operates crank 11, is fixed by bearing 38 and receives power from a source not shown.

In the embodiments shown in the drawing, shaft 24 extends entirely across the device and is held in keepers 25 and 39, and similarly shaft 37 extends across the device and is held in keepers 40 and 41. Lever arms 22 and 31 are rigidly affixed to shafts 24 and 37, respectively, as by keying, whereby the rotative motion of shafts 24 and 37 may be communicated to duplicate lever arms and rod mechanism for raising and lowering the rake on the opposite side of the device and operatively connected with plates 6 and 7.

It will be seen that the rake is lowered on the forward motion to the left and raised on the backward motion to the right. To flatten the curve of the forward motion of the rake, it is necessary that the pivot 27 from which the rake is suspended shall be in a higher position in the center of the forward stroke than at the ends of the useful stroke. This is accomplished by having the rod 16 of such length that at the central point of the forward stroke, as shown in the drawing, the pin 21 will be at a point beyond a straight line from pins 23 to 20. In the drawing this is shown to be to the right of the line. This results in shortening the distance between 23 and 20 and raising the pivot 27. It will be clear that the pivot 28 is in operative synchronism with pivot 27.

It will be seen that the toggle link arrangement employed in the present invention provides a novel means for securing a relatively long, substantially flat operating zone, increasing the conveying efficiency and dewatering effectiveness of the rake.

I claim:

1. In an ore conveyor and classifier comprising a trough and a rake having a relatively long, substantially flat operating zone reciprocally mounted in said trough, bell crank levers mounted at opposite ends of the trough, a link connecting said levers, links connecting said levers with said rake, a toggle link pivotally secured at one of its ends at a fixed point and at its opposite end to one of said levers, said toggle link being adapted for pivotal movement at substantially the center thereof, a rotatable shaft, a crank means rigidly secured at one of its ends to said shaft, a link connecting said crank means with said toggle link at the substantially central pivot thereof and a link connecting said crank means with said rake.

2. In a classifying rake having a relatively long, substantially flat operating zone, a drive shaft provided with a crank means, a rod operatively connected with the crank means and with the rake in a manner to impart backward and forward movement to the rake, bell cranks operatively connected with one another and with the rake, and means including a toggle link operatively connected with one of the bell cranks in a manner to raise and lower the rake, the toggle link comprising two pivoted arms, one arm at its free end being separately pivoted at a fixed point, the other arm at its free end being separately pivoted to one of the bell cranks, and a rod operatively connected with the central pivot of the two arms and with the crank means, the last-mentioned rod being of a length such that at the central point of the forward stroke of the rod the central pivot is at a point beyond a straight line between the first pivot and the bell crank pivot.

DAVID M. WRIGHT.